T. H. BLAIR.
Photographic Apparatus.
No. 226,022 Patented Mar. 30, 1880.
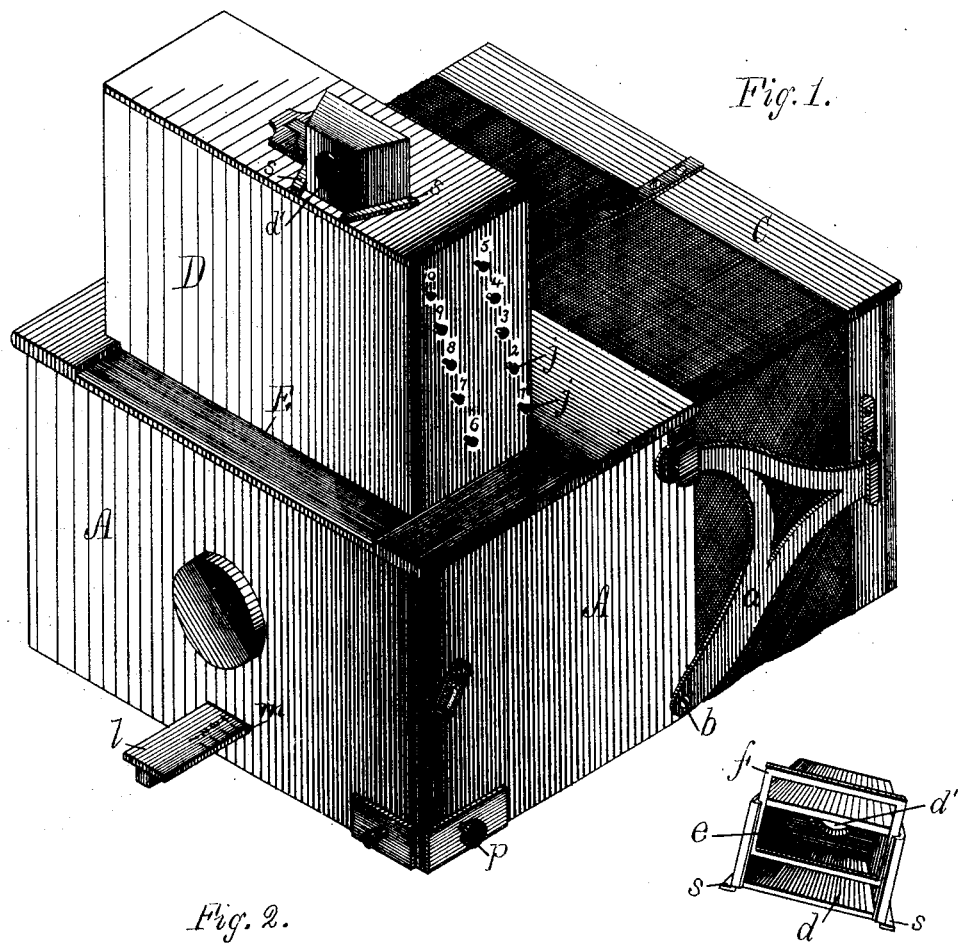
Fig. 1.
Fig. 3.
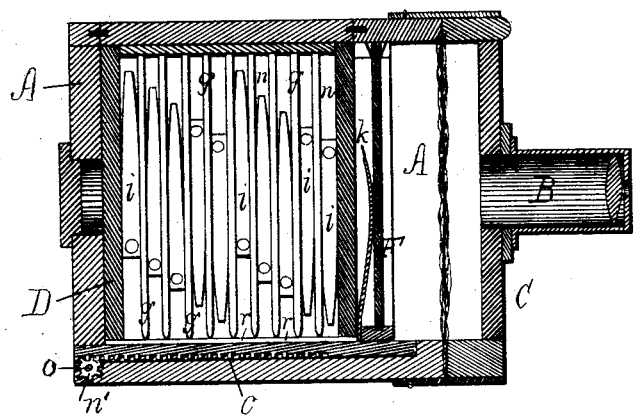
Fig. 2.
Witnesses. Inventor.
T. H. Blair.
F. Curtis, Atty.

UNITED STATES PATENT OFFICE.

THOMAS H. BLAIR, OF FRANKLIN, MASSACHUSETTS.

PHOTOGRAPHIC APPARATUS.

SPECIFICATION forming part of Letters Patent No. 226,022, dated March 30, 1880.

Application filed November 17, 1879.

*To all whom it may concern:*

Be it known that I, THOMAS H. BLAIR, of Franklin, in the county of Norfolk and State of Massachusetts, have invented certain useful Improvements in Photographic Apparatus, of which the following is a specification.

My present invention relates to means for enabling the art of making photographic pictures by the "dry-plate" process to be carried on by amateurs or persons having little knowledge of the art, as well as to greatly simplify the labor of professional photographers, by adapting to a camera mechanical devices by means of which the various manipulations of the camera and plates are carried on entirely from the outside of the camera-box, the latter not necessarily being opened during the entire operation of adjusting the camera to the view, focusing the lens, bringing the plate into position to be exposed, and returning such plate to its case, &c.

The nature and operation of my improvements will be described hereinafter.

The drawings accompanying this specification represent, in Figure 1, a perspective view, and in Fig. 2 a vertical section, of a camera embodying my improvements. Fig. 3 is a perspective view of the portable eye-piece or adjuster.

In such drawings the box or case of the camera is shown at A, and the lens at B, the latter being affixed to the front C of the box A, and such front being detachable from the remainder, in order that it may be moved forward or extended when occasion requires, such front C and the lens, when advanced, as stated, being supported in an upright position by swinging brackets *a*, applied to opposite ends of the box A, and adapted to turn on their pivots *b*, as shown in Fig. 1, a curtain of dark stuff being employed between the camera-box and the front C to exclude light from the interior of the former.

One novel feature in my present invention consists in a portable eye-piece or adjuster, *d*, as it may be termed, which, as shown in Fig. 3 of the drawings, is a small hood, of wood or metal, having a peep-hole, *d'*, at the rear, and an opening, *e*, in front, which determines the boundary of the view to be taken, the hood with its opening corresponding with the camera and lens, thus enabling the adjustment of the camera as to position to be effected without looking through the lens, as has heretofore been universally practiced.

To avoid the labor and trouble of moving the entire camera about in determining the view to be taken, the adjuster may be held in the hand and the view determined with it, and it then is to be, or may be, secured to the top of the camera for final adjustment of the latter, as shown in Fig. 1 of the drawings.

The front of the adjuster or hood *d* is provided with an open frame or slide, *f*, which determines definitely the boundary of the picture, and corresponds to the size of the negative plate to be used, and these slides are to vary in size with different-sized negatives and lenses. The camera is provided with the ordinary peep-hole, which may be used, if required; but with the adjuster it will not be necessary.

The glass plates are contained in a rectangular inverted box, D, which is adapted to enter an opening, E, in the rear upper part of the camera-box, such plate-box, when not in use, being lowered into the interior of the camera through said opening, which is closed by a suitable slide, as shown in Fig. 2 of the drawings, and when the box is in use it is erected upon the top of the camera and over the opening, as shown in Fig. 1 of the drawings.

The interior end walls of the plate-box are grooved, as shown at *g g*, &c., and each oppositely-disposed pair of grooves serve to support a plate, *n*, while at the bottom of each groove, upon one end of the box, I place a plate-spring, *i*, which is secured at one end within the groove by a screw.

Opposite the free end of each spring I screw through the end of the plate-box D a screw, *j*, which abuts against the spring, and by means of which the spring may be forced tightly up to the edge of the plate, and by clamping the latter within the grooves securely hold it in place. When a plate is to be lowered into the camera-box below, the screw is retracted, and the pressure of the spring upon the plate relaxed, and the latter falls by its own weight into the slide or carriage, which is shown at F as disposed within the camera-box.

Heretofore the front part of the camera, carrying the lens, has been movable toward and away from the camera-box, carrying the object-glass or the negative, as the case may be.

In lieu of this construction I have adapted the slide or carrier and arranged it to slide to and fro in the camera-box with respect to the lens, thus moving the object-glass toward or away from the lens instead of moving the lens, as heretofore, which enables me to adopt the automatic method of transferring the various glass plates from their box to the carrier, or vice versa. I have added to the carrier several features, as follows: first, one or more springs, $k$, applied to its rear side, and so as to impinge against the plate and press the latter forward against the outer edges or boundaries of the upright grooves in the carriage, in order to insure a uniform position of the plate with respect to the lens; secondly, I have added to the under side of the carriage a thin bar or plate, $l$, which extends rearward through an opening, $m$, in the rear side of the camera-box, and I engrave upon the top of this bar a series of numerals, 1, 2, 3, &c., which correspond with like numerals placed on the heads of the screws $j$, or upon the end of the plate-box in the immediate vicinity of such screw-heads, the numerals on the bar being so adjusted with respect to the grooves in the said box and with the screws that as the bar, and with it the carriage, is advanced or retracted and stopped upon any one of the numerals (taking the rear side of the camera-box as a zero or starting point) the grooves of the plate-box corresponding to this numeral shall be directly over or coinciding with the grooves of the carriage, and so that if the plate contained in the former groove is allowed to fall it will drop directly into and be supported in an upright position by the carriage, without necessity on the part of the operator of opening the camera-box.

The sliding movements of the bar and carriage are effected by a pinion, $n'$, affixed to a shaft, $o$, disposed within a recess in the bottom of the camera-box and having a head, $p$, outside of such box, by which it may be rotated, the pinion engaging a toothed rack, $c$, affixed to or cut upon the under side of the bar, as shown in Fig. 2 of the drawings.

A clamp of any suitable character may be combined with the shaft $o$ to prevent accidental turning of the latter.

The bottom of the plate-box is to be provided with a sliding bottom, $r$, which, when the camera is in use, constitutes a cover to such box.

As before stated, the rear side of the camera-box may be taken as a zero mark or pointer, and the distances between the numerals on the bar are, of course, equal to the distances between the grooves of the plate-box.

In operating with this instrument the portable or removable adjuster is taken from the wearer's pocket, where it may usually be carried, and with it the picture to be taken may be determined upon without recourse being had to the camera, and when the picture or view is ascertained the adjuster is placed upon the top of the plate-box in suitable hasps $s\ s$, arranged for its reception, as shown in Fig. 1 of the drawings, and the plate-box placed upon the top of the camera and over the opening, it being understood that the said plate-box is filled with sensitized glass plates adapted to photographing by the dry-plate process. The final and nice adjustment of the camera is now made by looking through the adjuster, or, if deemed desirable, through the regular peephole of the camera, which is provided with a cover for closing it when not used. The focusing of the lens is now accomplished in the usual manner, the cover of the peep-hole of the camera-box being removed for the purpose, and subsequently replaced and a mark made upon the bar close up to the face of the camera-box, in order that the carriage, after being retracted to receive its plate, may be advanced to the same point—that is, to the focus thus predetermined—without admitting light to the interior of the camera. The adjustment or placing of the camera and the focusing of the lens being accomplished, as stated, the carriage, by means of the rack and pinion, is retracted until one of the plates in the plate-box—for instance, that contained in groove 6—coincides with the carriage, which result is determined by bringing the numeral on the index-bar corresponding to such plate—that is, No. 6—against the face of the camera-box, as before stated. The sliding bottom of the plate-box is now removed and the screw No. 6 retracted, which releases the plate No. 6, and the latter drops into the carriage below. The carriage containing the sensitized plate is now advanced or retracted, as the case may be, until the plate is brought into focus, which is determined by the mark previously made on the index-bar, as before stated, and the plate is exposed and the negative obtained. After the plate has been exposed the proper length of time the carriage is now moved until the negative arrives below the groove 6 in the plate-box above, which is ascertained by bringing the mark 6 on the index-bar against the camera-box, as before explained, when the entire instrument is turned bottom up, and the negative drops back again into its original position in the plate-box, where it remains concealed from the light until removed for the purpose of being developed.

The operations above explained are to be repeated until all the plates in the box have been converted into negatives, or so many of them as may be required, when the sliding bottom of the box is replaced and the latter removed from the camera until such time as the negatives are to be developed.

It will thus be seen that the sensitized plates are by my method secluded from the light during the entire process of taking the negative. It will also be seen that by my invention little or nothing is left to the skill of the operator, as even the focusing of the lens and the time of exposure of the sensitized plate may be predetermined upon and provided for by rules adapted to varying conditions of weather, &c. Hence the only exercise of judgment required on the part of the operator will be to select the view or picture.

By the use of the portable adjuster the interior of the camera is always dark, as the light is never admitted, and the camera itself need not be moved about in the act of selecting or determining the view to be taken, as this may be done by the adjuster above.

Another advantage of especial importance to amateur photographers resulting from the use of the adjuster is seen in the fact that the view of the picture is not represented bottom up, as is now the case.

I would add that the upper ends or mouths of the grooves in the plate-box, as well as the grooves in the plate-carrier, are enlarged or flaring at the top, in order to guide the plate into the groove with certainty and prevent such plate from striking against the sharp corners of the edges of the grooves as it falls from the box to the carrier, or vice versa.

I would also add that the top of the interior of the plate-box should be lined with felt, rubber, or other suitable material, to break the fall of the negative as the latter drops into the box on reversal of the camera, and the lower part of the plate-carrier should be similarly provided, and for a like object.

I claim—

1. The combination, with the camera-box and lens and the sensitized plate-box grooved to receive a number of such plates and provided on the exterior with numerals or other characters distinguishing each groove, of a longitudinally-sliding plate-carrier arranged within and operated from exterior of the camera-case, and an index-bar connected therewith, extending to the exterior of said case, the marks on said index-bar corresponding to the marks on the plate-box, substantially as and for the purposes set forth.

2. The combination, with the camera-case A and lens-carrying extension-frame C, connected with the camera-case by pliable material, as described, of the extension-brackets $a$, pivoted at $b$, constructed and arranged to support and uphold the frame C in its extended position, as hereinbefore shown and set forth.

3. In combination with a photographic camera, a portable adjuster, $d$, with its aperture $d'$ and field-determining slide $f$, corresponding in function to the peep-hole of the camera, and adapted to act in correspondence with the lens and negative plate employed, substantially as described and set forth.

THOMAS H. BLAIR.

Witnesses:
R. E. CAPRON,
GEO. W. BLAKE.